United States Patent
Jobe et al.

(10) Patent No.: US 8,062,128 B2
(45) Date of Patent: Nov. 22, 2011

(54) UTILIZING LINE-OF-SIGHT VECTORS IN A GAME ENVIRONMENT

(75) Inventors: Dylan F. Jobe, Merriman, UT (US); Jeffrey T. Limback, Park City, UT (US)

(73) Assignee: Sony Computer Entertainment America LLC, Foster City, CA (US)

( * ) Notice: Subject to any disclaimer, the term of this patent is extended or adjusted under 35 U.S.C. 154(b) by 2248 days.

(21) Appl. No.: 10/443,612

(22) Filed: May 21, 2003

(65) Prior Publication Data

US 2004/0219979 A1    Nov. 4, 2004

Related U.S. Application Data (60) Provisional application No. 60/466,559, filed on Apr. 29, 2003.

(51) Int. Cl.
*A63F 13/00* (2006.01)

(52) U.S. Cl. ............... 463/31; 463/30; 463/32; 463/33; 463/34; 273/440; 273/441; 273/454

(58) Field of Classification Search ............... 463/30–34; 273/440, 441, 454; 345/156, 161
See application file for complete search history.

(56) References Cited

U.S. PATENT DOCUMENTS

| | | | | |
|---|---|---|---|---|
| 5,574,836 | A * | 11/1996 | Broemmelsiek | 345/427 |
| 5,769,718 | A * | 6/1998 | Rieder | 463/31 |
| 6,002,738 | A | 12/1999 | Cabral et al. | |
| 6,320,580 | B1 * | 11/2001 | Yasui et al. | 345/421 |
| 6,361,438 | B1 * | 3/2002 | Morihira | 463/31 |
| 6,411,298 | B1 | 6/2002 | Goto et al. | |
| 6,529,206 | B1 | 3/2003 | Ohki et al. | |
| 6,738,059 | B1 * | 5/2004 | Yoshinaga et al. | 345/419 |
| 6,744,442 | B1 | 6/2004 | Chan et al. | |
| 6,803,910 | B2 | 10/2004 | Pfister et al. | |
| 6,903,738 | B2 | 6/2005 | Pfister et al. | |

* cited by examiner

*Primary Examiner* — Peter DungBa Vo
*Assistant Examiner* — Sunit Pandya
(74) *Attorney, Agent, or Firm* — Lewis and Roca LLP (57) ABSTRACT

Utilizing line-of-sight volumes in a game environment comprises calculating a line-of-sight vector defined by the position of a game camera and the position of a character in the game environment, determining whether one of a set of predetermined game elements intersects the line-of-sight vector, and if the line-of-sight vector is intersected, replacing the game element with its corresponding line-of-sight volume. In one embodiment, a line-of-sight volume is a grid volume that has the same size and shape as it corresponding game element. The line-of-sight volume allows a user to substantially view the character in the game environment.

31 Claims, 7 Drawing Sheets

UTILIZING LINE-OF-SIGHT VECTORS IN A GAME ENVIRONMENT

CROSS REFERENCE TO RELATED APPLICATION

This application is related to, and claims the priority benefit of, U.S. Provisional Patent Application No. 60/466,559, entitled "System and Method for Utilizing Line-of-Sight Volumes in a Game Environment," filed Apr. 29, 2003. The subject matter of the related application is incorporated by reference.

BACKGROUND OF THE INVENTION

1. Field of the Invention

This invention relates generally to electronic entertainment systems and relates more particularly to a system and method for utilizing line-of-sight volumes in a game environment.

2. Description of the Background Art

Many video games have three-dimensional game environments and allow a character controlled by a user to freely roam within those environments. Game environments are often complex and include many game elements other than characters. Exemplary game elements are structures, walls, pillars, vehicles, rocks, trees, and hills. Characters may interact with some of these game elements, for example by driving a vehicle. Other game elements, for example trees, may only be part of the background and will not react to actions by the character.

Generally, a camera is an entity in game software that defines the area of the game environment that a system displays on a screen at any given time. What the camera "sees" is what is displayed on the screen. In some games, the camera follows the movements of a main character through the game environment, providing a third-person view of the game environment. In such a game, the main character may move into an area of the game environment that is hidden from the camera's view. For example, the main character may be behind a boulder or in a corner formed by walls.

In some games, the user has some control over the camera and can reposition it to bring the main character into view. However, in other games, the user has no or very limited control over the camera. In these games, the user must maneuver the main character to bring it into view. But since the main character is hidden, the user may not be sure exactly how to move the main character relative to the obscuring game element, and may need to randomly articulate the game controls to eventually maneuver the main character from its hidden position.

Dealing with a character hidden by other game elements can be very frustrating for a user, particularly a novice user who is unfamiliar with the niceties of game controls. Even experienced users may be irritated by such interruptions in game play, particularly in fighting games when an attacking opponent may also be hidden from the camera.

In some games, a camera automatically re-positions itself when a character is lost from view. In other games, the game software may switch to another camera when one camera loses sight of a character. Each of these approaches requires significant system processing resources to be accomplished.

SUMMARY OF THE INVENTION

A method for utilizing line-of-sight volumes in a game environment includes calculating a line-of-sight vector defined by the position of a game camera and the position of a character in the game environment, determining whether a plane of one of a set of predetermined game elements intersects the line-of-sight vector, and if the line-of-sight vector is intersected, replacing the game element with its corresponding line-of-sight volume.

A system for utilizing line-of-sight volumes in a game environment includes a memory configured to store game software, a processor configured to execute the game software, and a display device. The game software includes game element data and line-of-sight volume data. The game element data includes a set of predetermined game elements. The line-of-sight volume data includes a corresponding line-of-sight volume for each of the set of predetermined game elements. The game software calculates a line-of-sight vector in the game environment. If the line-of-sight vector is intersected by one of the set of predetermined game elements, the game software displays the corresponding line-of-sight volume on the display device.

In one embodiment, a line-of-sight volume is a grid volume that has the same size and shape as it corresponding game element. The line-of-sight volume allows a user to substantially view the character in the game environment.

DETAILED DESCRIPTION OF THE INVENTION

Figure 1:
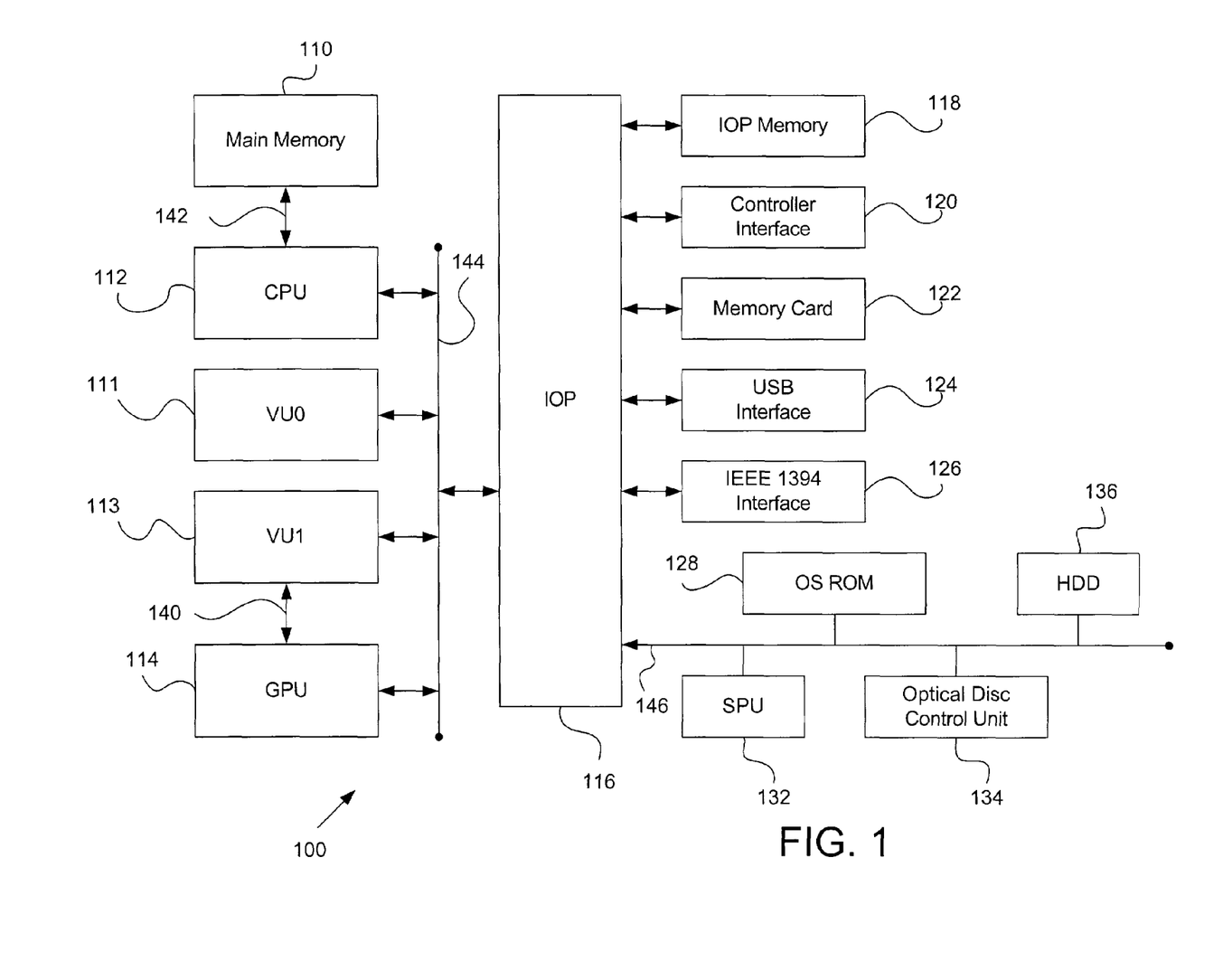
FIG. 1 is a block diagram of one embodiment of an electronic entertainment system, according to the invention.

FIG. 1 is a block diagram of one embodiment of an electronic entertainment system 100 in accordance with the invention. System 100 includes, but is not limited to, a main memory 110, a central processing unit (CPU) 112, vector processing units VU0 111 and VU1 113, a graphics processing unit (GPU) 114, an input/output processor (IOP) 116, an IOP memory 118, a controller interface 120, a memory card 122, a Universal Serial Bus (USB) interface 124, and an IEEE 1394 interface 126. System 100 also includes an operating system read-only memory (OS ROM) 128, a sound processing unit (SPU) 132, an optical disc control unit 134, and a hard disc drive (HDD) 136, which are connected via a bus 146 to IOP 116. System 100 is preferably an electronic gaming console; however, system 100 may also be implemented as a general-purpose computer, a set-top box, or a hand-held gaming device.

CPU 112, VU0 111, VU1 113, GPU 114, and IOP 116 communicate via a system bus 144. CPU 112 communicates with main memory 110 via a dedicated bus 142. VU1 113 and GPU 114 may also communicate via a dedicated bus 140. CPU 112 executes programs stored in OS ROM 128 and main memory 110. Main memory 110 may contain prestored programs and may also contain programs transferred via IOP 116 from a CD-ROM, DVD-ROM, or other optical disc (not shown) using optical disc control unit 134. Main memory 110 may also contain programs transferred via IOP 116 from a remote server via a network (not shown). IOP 116 controls data exchanges between CPU 112, VU0 111, VU1 113, GPU 114 and other devices of system 100, such as controller interface 120.

GPU 114 executes drawing instructions from CPU 112 and VU0 111 to produce images for display on a display device (not shown). VU1 113 transforms objects from three-dimensional coordinates to two-dimensional coordinates, and sends the two-dimensional coordinates to GPU 114. SPU 132 executes instructions to produce sound signals that are output on an audio device (not shown).

A user of system 100 provides instructions via controller interface 120 to CPU 112. For example, the user may instruct CPU 112 to store certain game information on memory card 122 or may instruct a character in a game to perform some specified action. Other devices may be connected to system 100 via USB interface 124 and IEEE 1394 interface 126.

Figure 2:
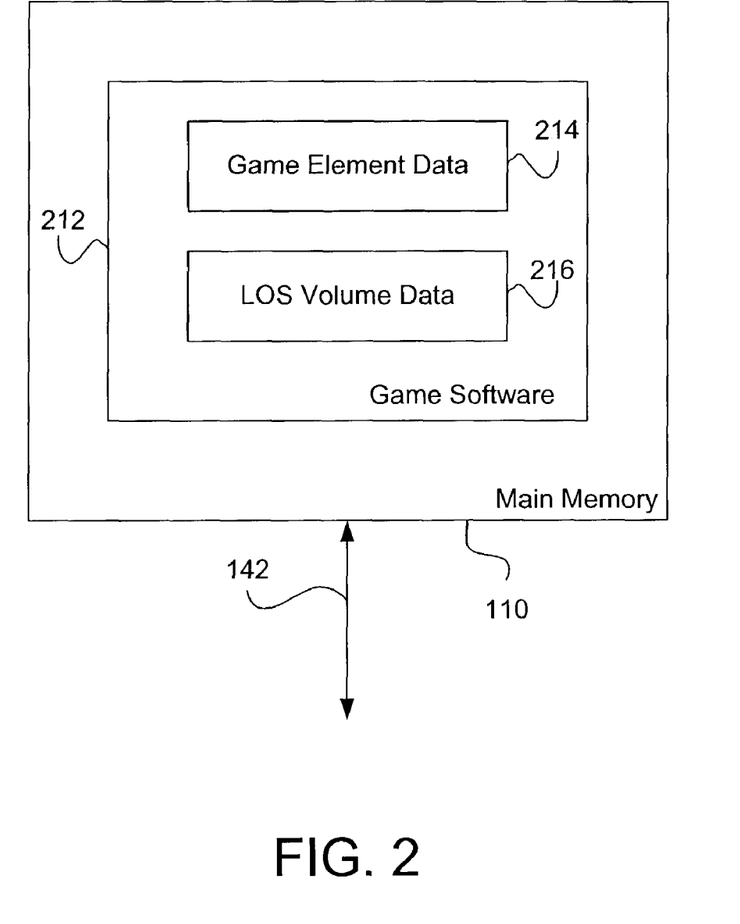
FIG. 2 is a block diagram of one embodiment of the main memory of FIG. 1, according to the invention.

FIG. 2 is a block diagram of one embodiment of main memory 110 of FIG. 1, according to the invention. Main memory 110 includes, but is not limited to, game software 212 which includes instructions executable by CPU 112, VU0 111, VU1 113, and SPU 132 that allow a user of system 100 to play a game. In the FIG. 2 embodiment, game software 212 is a fighting game where a user controls the actions of a character roaming in a three-dimensional game environment. In other embodiments, game software 212 may be any other type of game, including but not limited to a combat simulation game, a role-playing game (RPG), a flight simulation game, and a civilization-building simulation game.

Game software 212 includes, but is not limited to, game element data 214 and line-of-sight (LOS) volume data 216. Game software 212 uses game element data 214 to represent various game elements in the game environment. Game element data 214 include interactive game elements, such as characters and vehicles, and non-interactive game elements such as background structures and trees.

LOS volume data 216 includes data for LOS volumes that correspond to a set of predetermined game elements in game element data 214. A designer, producer, or programmer of game software 212 predetermines which game elements in game element data 214 have corresponding LOS volumes in LOS volume data 216. An LOS volume is a three-dimensional representation of a game element that may replace the game element in the game environment. In one embodiment, an LOS volume is a grid volume having a shape and size of its corresponding game element. LOS volumes are further discussed below in conjunction with FIGS. 3A-3D.

In another embodiment, game software 212 generates LOS volume data in real time. In other words, when game software 212 determines that an LOS volume should be displayed, game software 212 generates rendering instructions for a corresponding LOS volume. Thus, in this embodiment, LOS volume data is not stored in a memory.

Figure 3A:
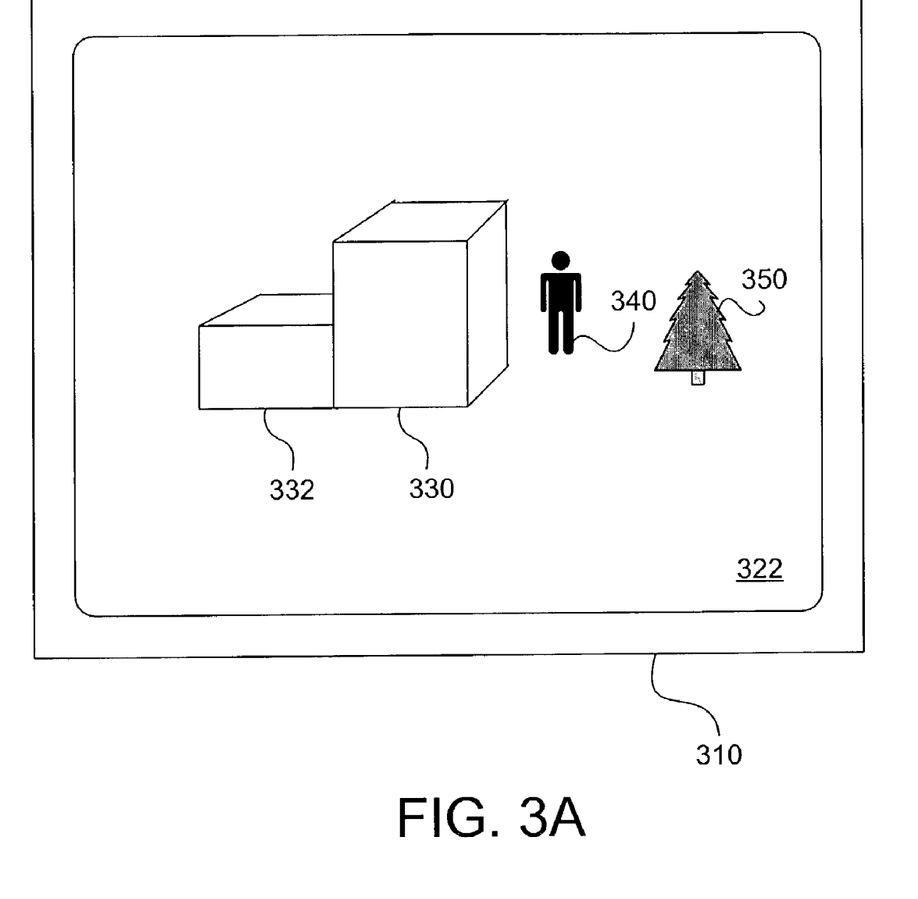
FIG. 3A is a diagram of a game screen, according to one embodiment of the invention.

FIG. 3A is a diagram of a game screen 322 on a display device 310, according to one embodiment of the invention. Game screen 322 includes, but is not limited to, structures 330 and 332, a character 340, and a tree 350. Although only one tree 350 is shown, the game environment may include additional trees and other types of environmental elements such as rocks, mountains, and bodies of water. Game screen 322 is a display of the game environment from the viewpoint of a game camera. For purposes of ease of illustration in FIGS. 3A-3D, the viewpoint of the game camera is perpendicular to the page. A user of system 100 controls the movements of character 340 in the game environment by actuating controls on a controller coupled to controller interface 120.

During game play, game software 212 continuously calculates a line-of-sight vector, which is a vector defined by the position of the camera and the position of character 340 in the game environment. Game software 212 determines whether the line-of-sight vector is intersected by a game element, such as structure 330. In other words, game software 212 determines whether the line-of-sight vector passes through any plane of a game element. If the line-of-sight vector is intersected by one of the set of predetermined game elements (or the line-of-sight vector passes through a plane of the game element), game software 212 replaces that game element with its corresponding LOS volume from LOS volume data 216. Not every game element shown in game screen 322 has a corresponding LOS volume in LOS volume data 216. For example, tree 350 does not have a corresponding LOS volume. So if tree 350 intersects the line-of-sight vector, game software 212 does not modify tree 350.

Figure 3B:
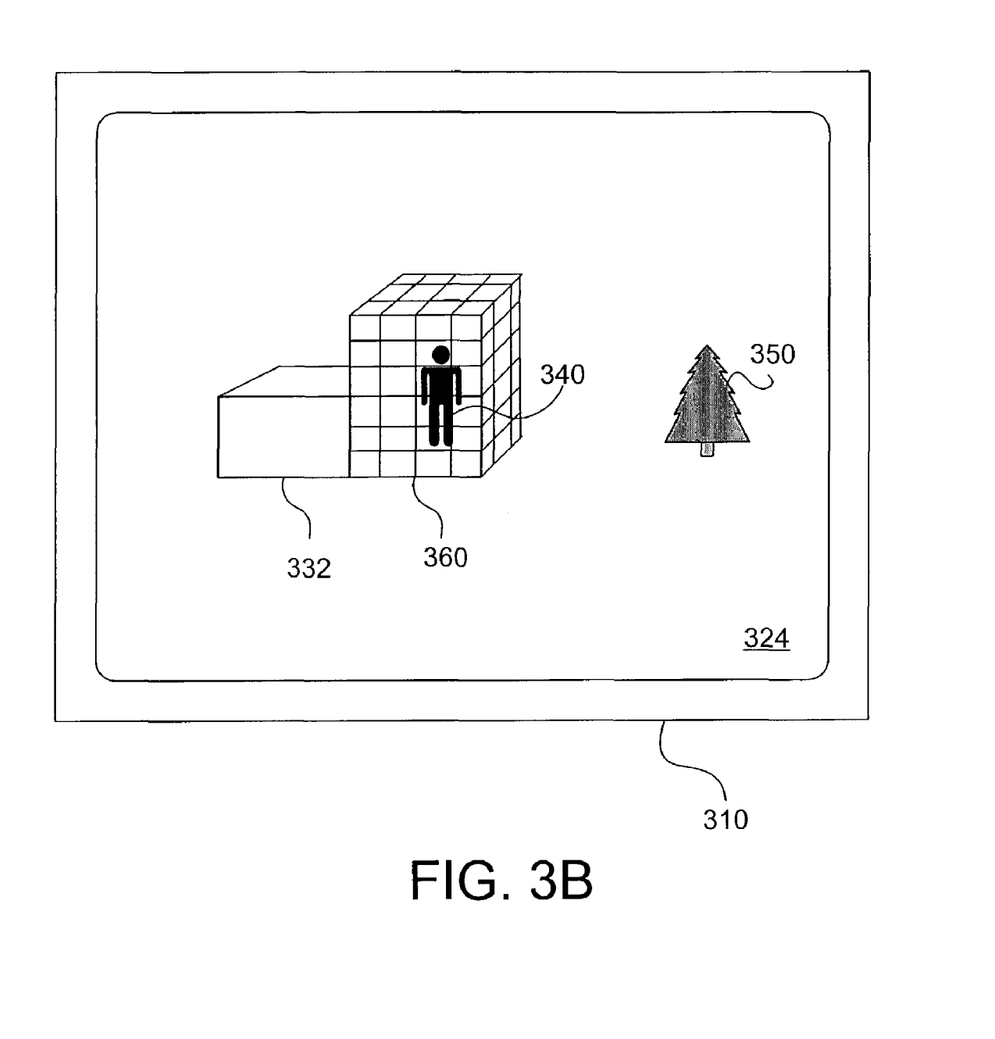
FIG. 3B is a diagram of a game screen, according to one embodiment of the invention.

FIG. 3B is a diagram of a game screen 324 on display device 310, according to one embodiment of the invention. Game screen 324 includes, but is not limited to, structure 332, character 340, tree 350, and a LOS volume 360. In FIG. 3B, the user has moved character 340 to a position that is behind the position of structure 330. Structure 330 thus intersects the line-of-sight vector, so game software 212 has replaced structure 330 with LOS volume 360. LOS volume 360 is a grid volume that has the same size and shape as structure 330. LOS volume 360 allows character 340 to be sufficiently visible for the user to maneuver character 340 in relation to LOS volume 360 as if structure 330 were still on-screen. For example, the user cannot move character 340 into the space in the game environment occupied by LOS volume 360.

In one embodiment, LOS volume 360 is a grid volume of white grid lines. The areas between the grid lines are shaded slightly darker than the rest of the game environment such that it is readily apparent to the user that there is some intervening material between the camera and character 340. The grid lines of LOS volume 360 obscure some portions of character 340. The grid lines of LOS volume 360 clearly present to the user the three-dimensional nature of LOS volume 360, which mimics the three-dimensional nature of structure 330.

Figure 3C:
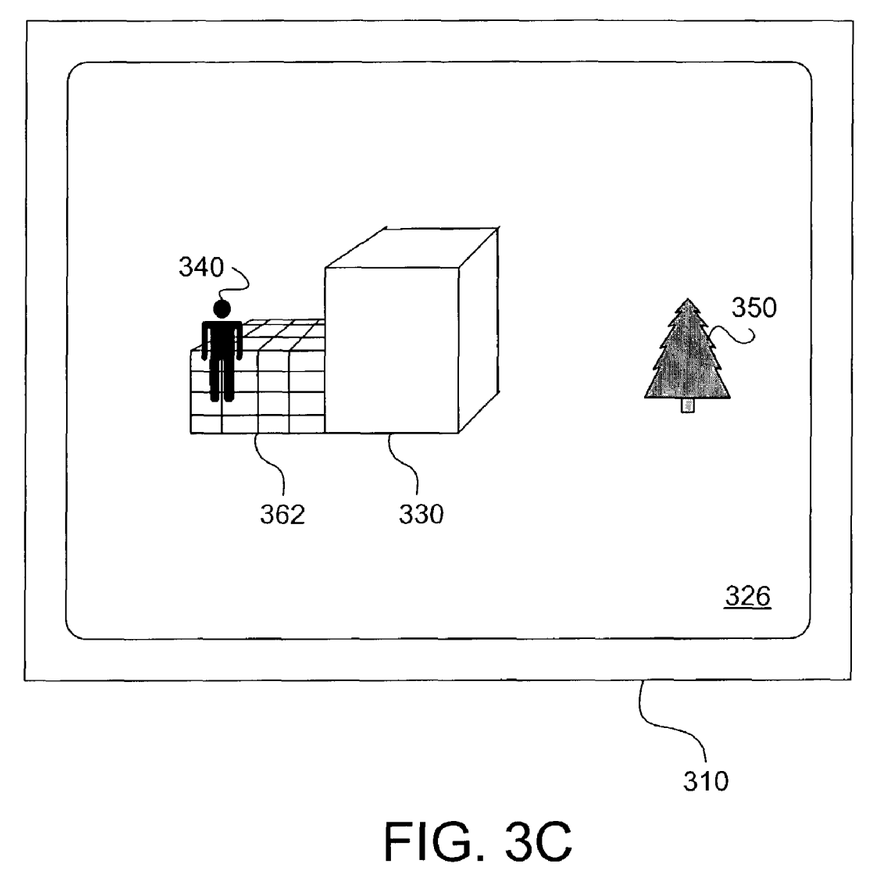
FIG. 3C is a diagram of a game screen, according to one embodiment of the invention.

FIG. 3C is a diagram of a game screen 326 on display device 310, according to one embodiment of the invention. Game screen 326 includes, but is not limited to, structure 330, character 340, tree 350, and a LOS volume 362. In FIG. 3C, the user has moved character 340 to a position behind the position of structure 332. Structure 332 intersects the line-of-sight vector (the line-of-sight vector passes through one or more planes of structure 332), so game software 212 has replaced structure 332 with LOS volume 362. Also, since character 340 is no longer behind the position of structure 330, game software 212 once again displays structure 330 on game screen 326.

As shown in FIG. 3C, character 340 is not entirely within the outside edges of LOS volume 362. Game software 212 will replace one of the predetermined game elements with its corresponding LOS volume when a significant portion of character 340 would otherwise be hidden by the game element.

Figure 3D:
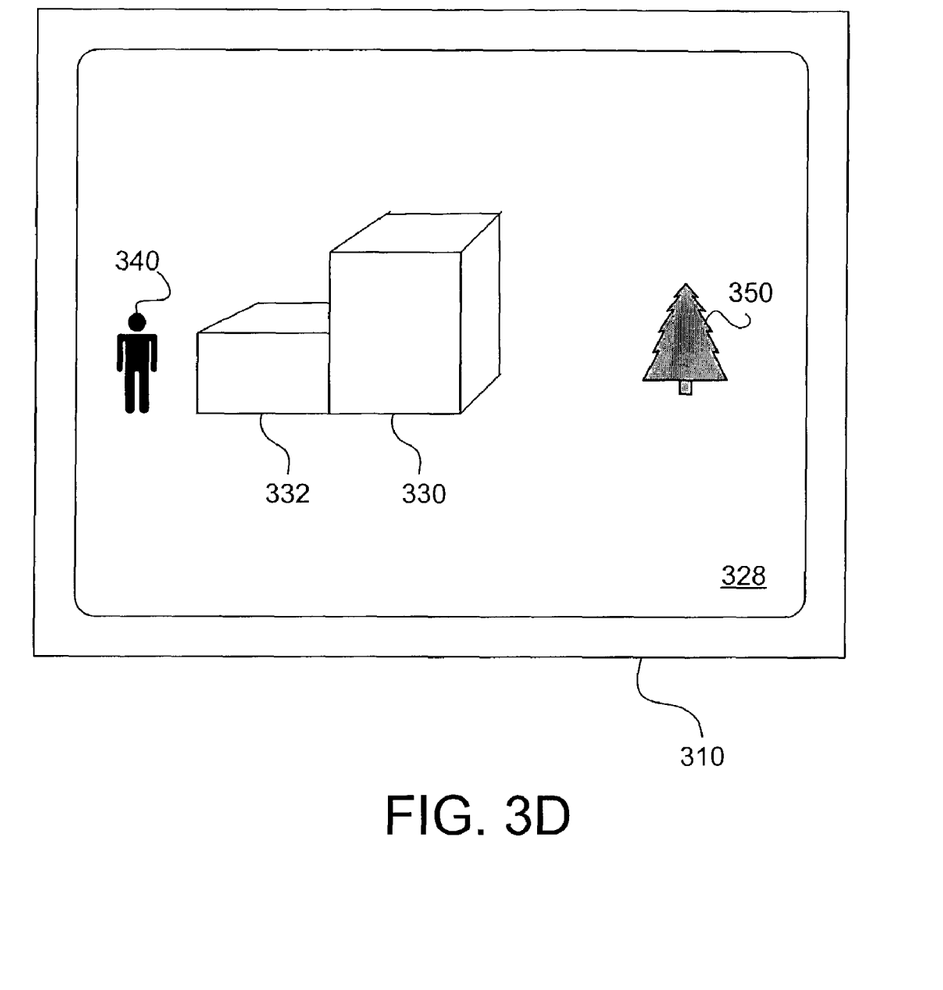
FIG. 3D is a diagram of a game screen, according to one embodiment of the invention.

FIG. 3D is a diagram of a game screen 328 on display device 310, according to one embodiment of the invention. Game screen 328 includes, but is not limited to, character 340, structures 330 and 332, and tree 350. In FIG. 3D, the user has moved character 340 to a position to the left of the position of structure 332. Since structure 332 no longer intersects the line-of-sight vector, game software 212 once again displays structure 332 on game screen 328.

Although LOS volumes 360 and 362 are shown as grid volumes, other embodiments of LOS volumes are within the scope of the invention. For example, LOS volumes may be shown as semitransparent volumes of a single color, for example white or gray. In another example, LOS volumes may have an outline of the same shape and size as the corresponding game element, but the game environment within the outline is shown as black and white instead of the usual color scheme.

In one embodiment, predetermined game elements that are large, for example structure 330, may have a set of corresponding LOS volumes in LOS volume data 216. The set of corresponding LOS volumes includes a plurality of LOS volumes where each corresponds to a portion of the game element. For example, structure 330 may have a set of corresponding LOS volumes in LOS volume data 216 that includes two LOS volumes, one representing a left half of structure 330 and the other representing a right half of structure 330. Thus if character 340 is in a position such that the left half of structure 330 intersects the line-of-sight vector, then game software 212 replaces the left half of structure 330 with its corresponding LOS volume and continues to display the right half of structure 330 normally.

In one embodiment, the LOS volume is defined as a certain area surrounding the character in the game environment. For example, the LOS volume may be defined as a "bubble" surrounding the character that is shown on screen when the line-of-sight vector intersects one or more planes of a game element. In this embodiment an entire game element, such as a structure, is not replaced by a corresponding LOS volume. Instead, a portion of the game element is shown as a LOS volume bubble surrounding the position of the character in the game environment.

Figure 4:
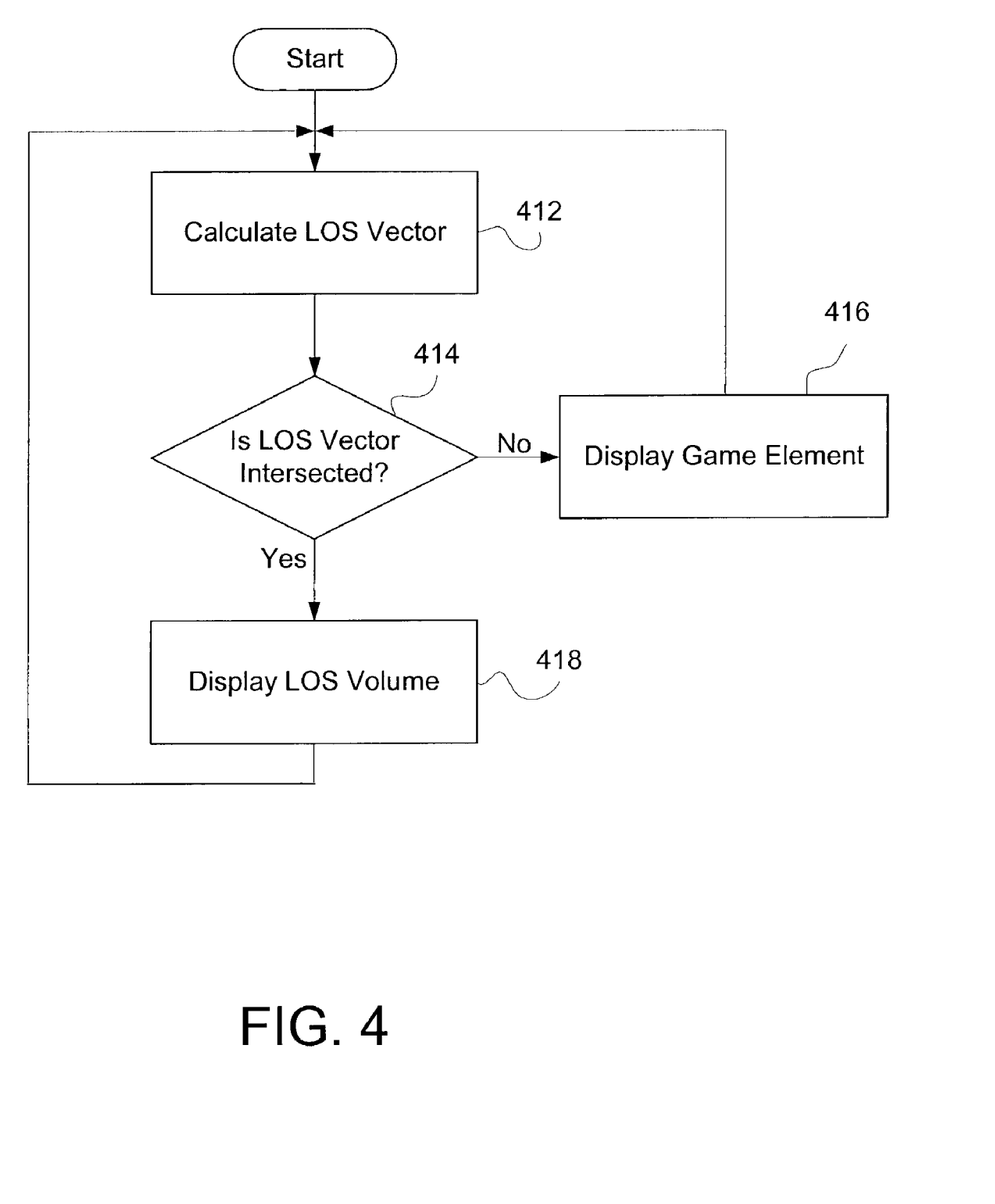
FIG. 4 is a flowchart of method steps for utilizing a line-of-sight volume, according to one embodiment of the invention.

FIG. 4 is a flowchart of method steps for utilizing a line-of-sight volume, according to one embodiment of the invention. In step 412, game software 212 calculates a line-of-sight vector that is determined according to the position of the camera and the position of character 340. Then, in step 414, game software 212 determines whether one of a set of predetermined game elements in game element data 214 intersects the line-of-sight vector (whether the line-of-sight vector passes through one or more planes of one of the set of game elements). If one of the set of predetermined game elements does not intersect the line-of-sight vector, then in step 416 game software 212 displays each game element currently on screen as usual. The method then returns to step 412.

If one of the set of predetermined game elements does intersect the line-of-sight vector, then in step 418 game software 212 displays the game element's corresponding LOS volume in LOS volume data 216 in the place of the game element. The method then returns to step 412. In one embodiment, game software 212 continues to perform the steps of the method of FIG. 4 until the game ends or is restarted.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for utilizing line-of-sight vectors in a game environment, comprising:
    calculating a line-of-sight vector in the game environment, wherein the line-of-sight vector is defined by a position of a game environment camera with respect to a position of an object in the game environment;
    determining whether the line-of-sight vector is intersected in the game environment by a plane of a game element corresponding to a line-of-sight volume; and
    replacing the game element that intersects the line-of-sight vector with a line-of-sight volume corresponding to the game element.

2. The method of claim 1, wherein the object is a game character in the game environment.

3. The method of claim 2, wherein the position of the game character in the game environment is controlled by a user playing a game.

4. The method of claim 2, wherein if the line-of-sight vector is not intersected by the plane of a game element corresponding to a line-of-sight volume, the game element corresponding to the line-of-sight volume continues to be displayed.

5. The method of claim 1, wherein the replacement of the game element that intersects the line-of-sight vector with the corresponding line-of-sight volume allows a user to substantially view the object in the game environment.

6. The method of claim 1, wherein the corresponding line-of-sight volume is a grid volume having a size and shape that matches the size and shape of the game element that intersects the line-of-sight vector.

7. The method of claim 6, wherein the grid volume comprises a thr dimensional grid of white lines.

8. The method of claim 1, wherein the corresponding line-of-sight volume is a semitransparent volume having a size and shape that matches the size and shape of the game element that intersects the line-of-sight vector.

9. The method of claim 8, wherein the semitransparent volume is white.

10. The method of claim 8, wherein the semitransparent volume is gray.

11. The method of claim 1, wherein the corresponding line-of-sight volume is a portion of the game element.

12. The method of claim 1, wherein the corresponding line-of-sight volume substantially mimics the game element that intersects the line-of-sight vector.

13. A system for utilizing line-of-sight vectors in a game environment, comprising:
    a memory configured to store game software including game element data and line-of-sight volume data, the game element data including a set of game elements that each correspond to a line-of-sight volume, the line-of-sight volume data each corresponding to one of the set of game elements;
    a processor configured to execute the game software; and
    a display device configured to display one of the set of game elements or its corresponding line-of-sight volume when a line-of-sight vector defined by a position of a game environment camera and a position of an object in the game environment is intersected by a plane of one of the set of game elements that corresponds to a line-of-sight volume as determined by the processor when executing the game software.

14. The system of claim 13, wherein the object is a character in the game environment.

15. The system of claim 14, wherein the position of the character in the game environment is controlled by a user playing a game.

16. The system of claim 13, wherein displaying the corresponding line-of-sight volume allows a user to substantially view the object in the game environment.

17. The system of claim 13, wherein the corresponding line-of-sight volume is a grid volume having a size and shape that matches the size and shape of the game element that intersects the line-of-sight vector.

18. The system of claim 17, wherein the grid volume comprises a three-dimensional grid of white lines.

19. The system of claim 13, wherein the corresponding line-of-sight volume is a semitransparent volume having a size and shape that matches the size and shape of the game element that intersects the line-of-sight vector.

20. The system of claim 19, wherein the semitransparent volume is white.

21. The system of claim 19, wherein the semitransparent volume is gray.

22. A computer-readable storage medium having embodied thereon one or more instructions executable by a computer to perform a method for utilizing line-of-sight vectors in a game environment, the method comprising:
   calculating a line-of-sight vector in the game environment, wherein the line-of-sight vector is defined by a position of a game environment camera with respect to a position of an object in the game environment;
   determining whether the line-of-sight vector is intersected in the game environment by a plane of a game element corresponding to a line-of-sight volume; and
   replacing the game element that intersects the line-of-sight vector with a line-of-sight volume corresponding to the game element.

23. The computer-readable storage medium of claim 22, wherein the object is a game character in the game environment.

24. The computer-readable storage medium of claim 23, wherein if the line-of-sight vector is not intersected by the plane of a game element corresponding to a line-of-sight volume, the game element corresponding to the line-of-sight volume continues to be displayed.

25. The computer-readable storage medium of claim 22, wherein the replacement of the game element that intersects the line-of-sight vector with the corresponding line-of-sight volume allows a user to substantially view the object in the game environment.

26. The computer-readable storage medium of claim 22, wherein the corresponding line-of-sight volume is a grid volume having a size and shape that matches the size and shape of the game element that intersects the line-of-sight vector.

27. The computer-readable storage medium of claim 26, wherein the grid volume comprises a three-dimensional grid of white lines.

28. The computer-readable storage medium of claim 22, wherein the corresponding line-of-sight volume is a semitransparent volume having a size and shape that matches the size and shape of the game element that intersects the line-of-sight vector.

29. The computer-readable storage medium of claim 28, wherein the semitransparent volume is white.

30. The computer-readable storage medium of claim 28, wherein the semitransparent volume is gray.

31. A system for utilizing line-of-sight vectors in a game environment, comprising:
   means for calculating a line-of-sight vector in the game environment, wherein the line-of-sight vector is defined by a position of a game environment camera with respect to a position of an object in the game environment;
   means for determining whether the line-of-sight vector is intersected in the game environment by a plane of a game element corresponding to a line-of-sight volume; and
   means for replacing the game element that intersects the line-of-sight vector with a line-of-sight volume corresponding to the game element.

* * * * *